(12) United States Patent
Newmark

(10) Patent No.: US 6,517,296 B2
(45) Date of Patent: Feb. 11, 2003

(54) HOLE FINISHING TOOL

(75) Inventor: David P. Newmark, New Rochelle, NY (US)

(73) Assignee: Vernon Devices, Inc., New Rochelle, NY (US)

( * ) Notice: Subject to any disclaimer, the term of this patent is extended or adjusted under 35 U.S.C. 154(b) by 0 days.

(21) Appl. No.: 09/887,952

(22) Filed: Jun. 21, 2001

(65) Prior Publication Data

US 2002/0197120 A1 Dec. 26, 2002

(51) Int. Cl.[7] .............................................. B23B 51/10
(52) U.S. Cl. ......................... 408/82; 408/112; 408/200
(58) Field of Search .............................. 408/80–82, 146, 408/112, 200–202

(56) References Cited

U.S. PATENT DOCUMENTS

| 2,187,221 A | | 1/1940 | Brown ........................ 144/251 |
| 2,418,790 A | | 4/1947 | Peckham, Jr. ............... 408/201 |
| 2,613,558 A | | 10/1952 | Swenson |
| 2,665,599 A | * | 1/1954 | Roman ....................... 408/112 |
| 2,694,321 A | | 11/1954 | Riza |
| 2,703,996 A | | 3/1955 | Reynolds et al. ........... 408/714 |
| 2,804,789 A | | 9/1957 | Randles et al. ............. 408/714 |
| 2,868,045 A | | 1/1959 | Fried .............................. 407/9 |
| 2,958,241 A | | 11/1960 | Wahli ......................... 408/146 |
| 3,099,174 A | * | 7/1963 | Cogsdill ....................... 408/83 |
| RE25,860 E | * | 9/1965 | Elias ............................. 408/82 |
| 3,302,495 A | * | 2/1967 | Schmid ........................ 408/82 |
| 3,537,338 A | | 11/1970 | Halpern ...................... 408/226 |
| 3,550,482 A | | 12/1970 | Lee ............................. 408/228 |
| 3,762,831 A | * | 10/1973 | Nicholson ................... 408/146 |
| 4,229,129 A | | 10/1980 | Schaenzer ................... 408/228 |
| 4,580,932 A | | 4/1986 | Depperman .................. 408/81 |
| 5,997,222 A | | 12/1999 | Rissler ......................... 408/82 |
| 6,368,032 B1 | * | 4/2002 | Chen .......................... 408/146 |

\* cited by examiner

*Primary Examiner*—Steven C. Bishop

(57) ABSTRACT

A hole-finishing hole finishing tool includes a pilot cone within which a quarter round section is free to be displaced in an axial direction. The quarter round section is resiliently biased away from a workpiece. When the tip of the pilot cone is inserted into a hole in a workpiece and force is applied, the quarter round section having a cutting element at its tip is displaced forward into contact with the perimeter of the hole, whereby chamfering is performed. The use of a single lip quarter-round cutting edge permits the tool to be used on small holes.

7 Claims, 3 Drawing Sheets

Section AA

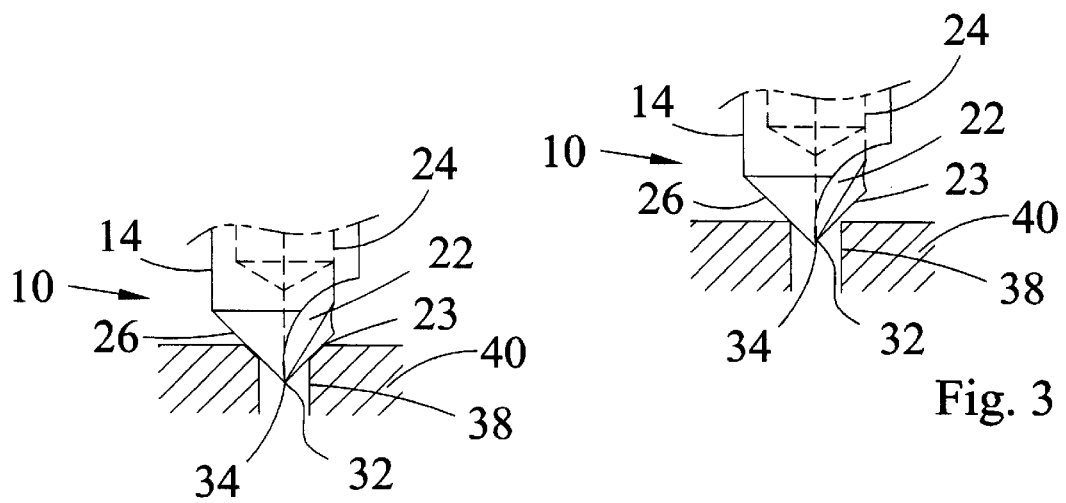
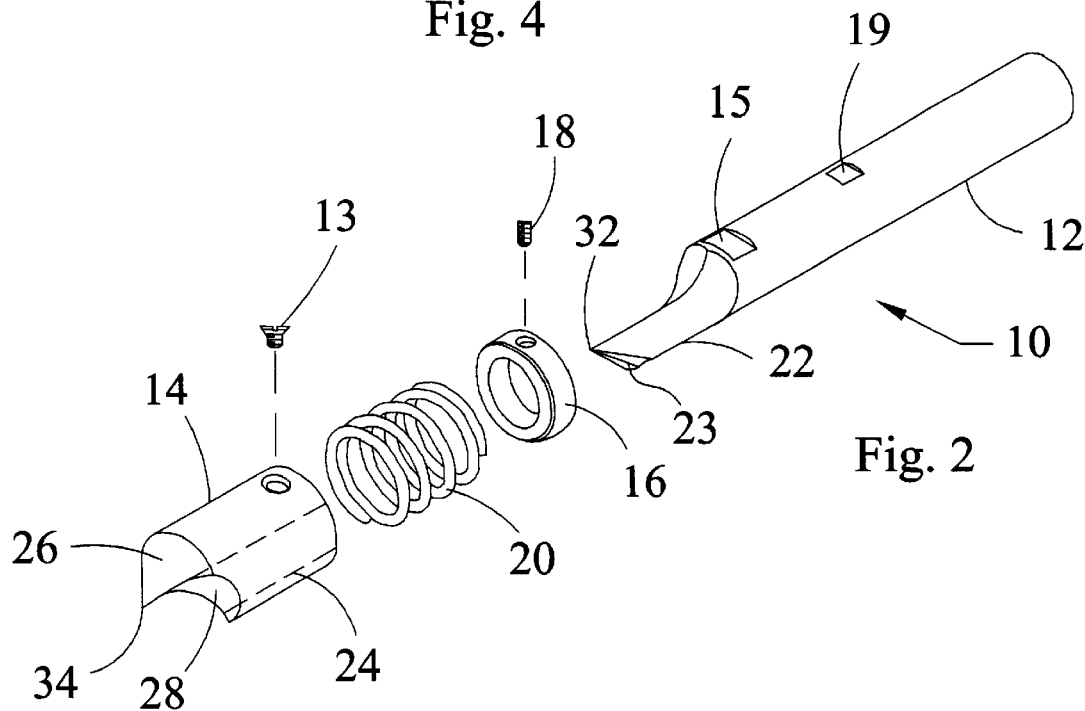
Fig. 3
Fig. 4
Fig. 2

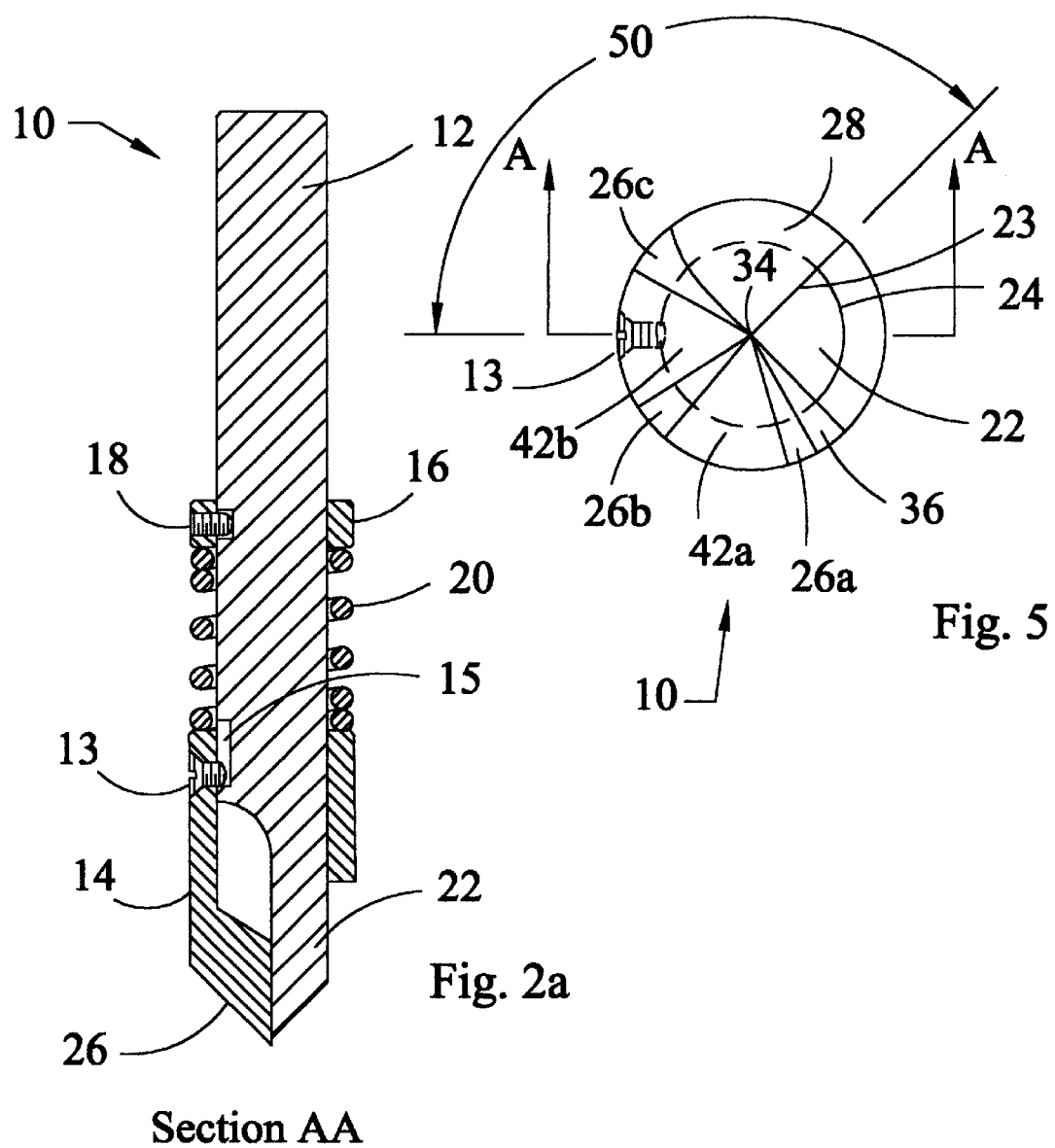

HOLE FINISHING TOOL

BACKGROUND OF THE INVENTION

The present invention relates to cutting tools and, more particularly, to tools for countersinking, chamfering and deburring holes.

When holes are made by drilling or punching in metal, ceramic or plastic, the holes are often rough at their entrances or exits. Conventionally, drill bits and the like are used as hole finishing tools to remove a small amount of material. Drill bits have the disadvantage that they are not adaptable to finishing small holes. In addition, especially when the holes are larger, tool chatter frequently produces roughness in the material.

A different type of hole finishing tool employs the hole in the material as a pilot hole into which is fitted a pilot piece. An angled cutting edge is guided by the pilot piece to remove a small amount of material at the entrance of the hole. Although the piloted hole finishing tool solves the problem of tool chatter, and consequent roughness of the cut, the pilot piece and cutting blades are relatively large, thus making the piloted hole finishing tool unsuitable for finishing small holes.

OBJECTS AND SUMMARY OF THE INVENTION

An object oft his invention is to provide an improved hole finishing tool for chamfering and deburring holes, particularly holes drilled or punched in metal.

Another object of this invention is to provide a hole finishing tool which offers the advantage of a piloted chamfering tool, but which is useable on large and very small holes alike.

A further object of this invention is to provide a dependable hole finishing tool suited for the manufacturing environment that is simple to use.

A still further object of the invention is to provide a hole finishing tool of simple design and construction that renders it relatively inexpensive to produce and therefore more cost effective to the end user.

Briefly stated, the present invention provides a hole-finishing hole finishing tool which includes a pilot cone within which a quarter round section is free to be displaced in an axial direction. The quarter round section is resiliently biased away from a workpiece. When the tip of the pilot cone is inserted into a hole in a workpiece and force is applied, the quarter round section is displaced forward into contact with the perimeter of the hole, thereby deburring, chamfering or countersinking is performed. The use of a pilot cone stabilizes the cutting element and a quarter round single lip cutting edge permits the tool to be used on small holes.

According to an embodiment of the invention, there is provided a hole finishing tool comprising: a support member, the support member having a shape that is fittable into a hole in a workpiece, a shank, an end of the shank passing through the support member, the end having a cutting element formed or fastened thereon, means for resiliently biasing the shank away from the support member sufficiently to withdraw the cutting element within a contour of the support member, and means for permitting the application of a force to the shank sufficient to extend the cutting element into working contact with a perimeter of the hole.

According to a feature of the invention, there is provided a hole finishing tool comprising: a pilot cone, the pilot cone including a slot passing axially therethrough, a shank, a section of the shank having a peripheral shape fitting through the slot, a cutting element at an extremity of the section, a resilient element axially biasing the shank away from the pilot cone sufficiently to withdraw the cutting element within a contour of the pilot cone, means for permitting the shank to be urged a predetermined distance forward by application of a force thereon, and the predetermined distance being sufficient to extend the cutting element into working contact with a perimeter of a hole in a workpiece.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a perspective view of the hole finishing tool of FIG. 1 disassembled to enable description thereof.

FIG. 2a is an axial cross section of the tool of FIG. 1 showing the relationship of the elements thereof in its quiescent condition.

FIG. 3 is a side view of the hole finishing tool of FIG. 1 resting on the perimeter of a hole in a workpiece before downward force is applied.

FIG. 4 is a side view similar to FIG. 3 but taken while a downward force is applied to chamfer the perimeter of a hole in the workpiece.

FIG. 5 is an end view of a hole finishing tool that employs a number of support bars instead of a conical surface, Additionally shown in this view is an optimum angular relationship between the pilot support members stop screw and the tools cutting edge.

DETAILED DESCRIPTION OF THE PREFERRED EMBODIMENT

Figure 1:
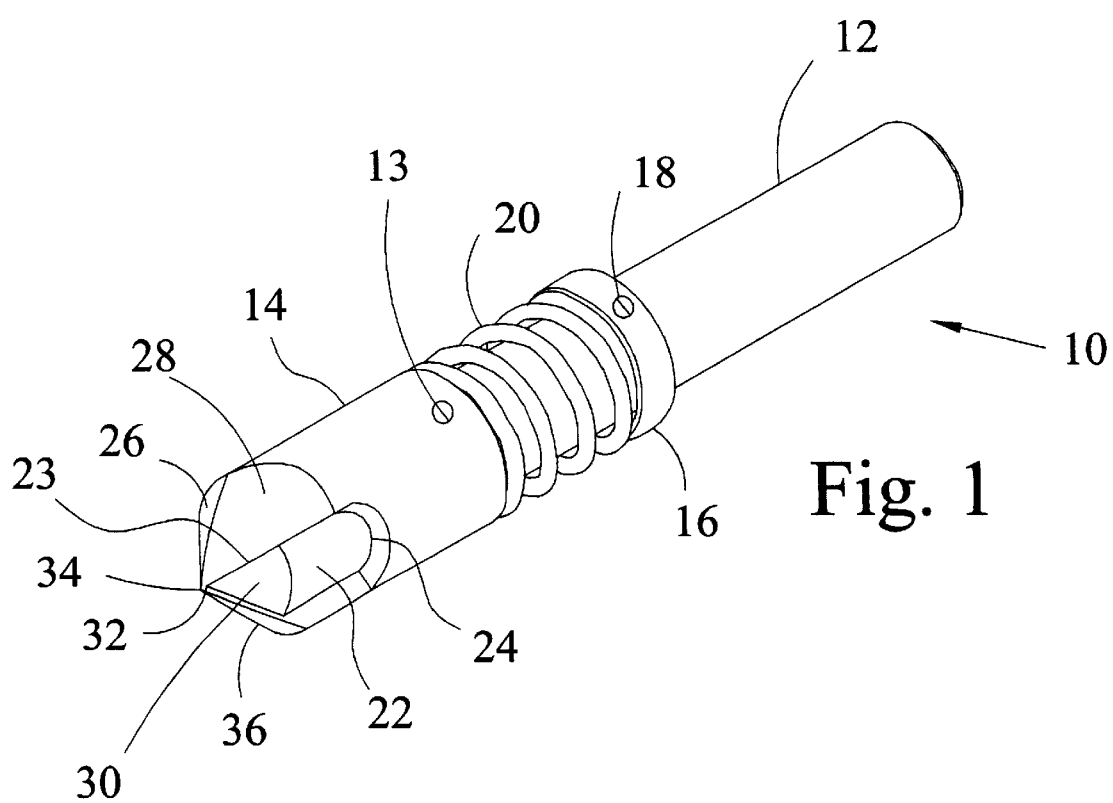
FIG. 1 is a perspective view of a hole finishing tool according to an embodiment of the invention.

Referring to FIGS. 1, 2 and 2a, a hole finishing tool, shown generally at 10, includes a shank 12 suitable for chucking in chuck of a drilling machine (not shown). A pilot cone 14 is slidably fitted on shank 12. Longitudinal travel of pilot cone 14 along shank 12 is limited by a stop screw 13 which is accommodated in a notch 15 in shank 12.

A spring stop collar 16 is affixed to shank 12 by any suitable means such as, for example, a set screw 18. Set screw 18 bears against a flat 19 in shank 12 A coil spring 20 is biased between pilot cone 14 and spring stop collar 16. A forward end of shank 12 is machined to a quarter round section 22. A slot 24 longitudinally through pilot cone 14 permits longitudinal sliding of quarter round section 22. A cutting edge 23 is formed in the rotationally leading edge of quarter round section 22.

Returning now specifically to FIG. 1, the end of pilot cone 14 includes a conical portion 26 extending approximately 180 angular degrees about the longitudinal axis of pilot cone 14. The remainder of the forward portion of pilot cone 14 includes the angle consumed by quarter round section 22 and the angle consumed by a chip clearance area 28. The leading part of quarter round section 22 is a portion of a cone 30. The cone angle of portion of a cone 30 generally matches the cone angle of conical portion 26 of pilot cone 14. A tip 32 of portion of a cone 30 lies immediately adjacent a tip 34 of conical portion 26. In the quiescent condition shown in FIG. 1, quarter round section 22 is retracted by the urging of coil spring 20 to place tip 32 slightly inward of tip 34. A relieved edge 36 at the leading perimeter of conical portion 26 permits conical portion 26 to rotate within a hole without interference or damage to the workpiece.

Referring now to FIG. 3, at the beginning of a machining operation of a hole 38 in a workpiece 40, hole finishing tool 10 is lowered into position with tip 34 of conical portion 26 entering hole 38. Tip 32 of portion of a cone 30 is retracted slightly from tip 34. In this condition, cutting edge 23 remains out of contact with the edge of hole 38.

Referring now to FIG. 4, when a downward force is applied to shank 12, contact between conical portion 26 and the perimeter of hole 38 produces an upward force. This upward force compresses coil spring 20, thereby permitting quarter round section 22 to advance. As quarter round section 22 advances with respect to pilot cone 14, cutting edge 23 contacts the perimeter of hole 38 to debur or chamfer the same.

It is to be noted that the entire operation described above requires only the alignment of tip 34 with hole 38, and then the downward urging of hole finishing tool 10 to complete the hole finishing operation. In a typical manufacturing situation, shank 12 of hole finishing tool is chucked in a drill press, and the entire operation is completed in a single feed of the drill press. This simplicity of operation promises a significant reduction in time and consequent cost of hole finishing.

One skilled in the art will recognize that, although the leading portion of shank 12 is characterized as "quarter round section 22", neither the angular extent nor the shape of this element is limited by this characterization. Quarter round section 22 may have a shape in at least a portion of its extent that is other than quarter round. In addition, quarter round section 22 may occupy substantially more or less than 90 angular degrees. Also, the angular extent of conical portion 26, although described as being approximately 180 angular degrees in extent, may be substantially more or less than this angular extent. The only factor governing the angular extent of conical portion 26 is that the angular extent be sufficient to support pilot cone 14 with cutting edge 23 out of contact with workpiece 40 in the absence of a downward force on shank 12.

Referring now to FIG. 5, an embodiment of a hole finishing tool 10' differs from the above-described embodiment in that the conical surface of pilot cone 14 is replaced with a plurality of support bars 26a, 26b and 26c. Support bars 26a–26c perform the same supporting function as the conical surface of pilot cone 14, but are separated by machined portions 42a and 42b which do not touch the workpiece in operation. As in the prior embodiment, support bars 26a–26c bear against the edge of the hole in the workpiece, thereby centering hole finishing tool 10', and permitting the application of force to urge the tip of quarter round section 22 into cutting contact with the perimeter of the hole.

Shown also in FIG. 5 is the optimum angular relationship 50 between cutting edge 23 and stop screw 13 in pilot cone 14. It is found that when angle 50 is kept between forty-five and two hundred and twenty five degrees measured counterclockwise from cutting edge 23 in FIG. 5, the overall length of tool 10' can be kept to a minimum. If set screw 13 is located in a closer angular proximity to quarter round section 22, notch 15 must be machined to close quarter round section 22, whereby, thinning the cross section of shank 12 and weakening the quarter round section 22. This not being desirable, notch 15 either must be moved farther back on shank 12, which in turn would require that the length of cone pilot 14 be lengthened, in turn increasing the over all length of tool 10', or be in the preferred optimum angular relationship 50.

The embodiments are described in the environment of a chamfering tool. For this environment, the end of quarter round section 22 is a portion of a cone. Such a shape is not a necessary limitation on the present invention. For example, the present invention may be used in a counter bore. For a counterboring application, the end of quarter round section 22 is squared of at right angles to the axis of the tool, and cutting edge 23 is modified from its angled position to a position that extends generally radially outward from the axis of the tool. One skilled in the art will recognize that shank 12 must be withdrawn further away from tip 34 until the end of quarter round section is fully contained within the contour of pilot cone 14.

Various other shapes may be substituted for the conical shape of pilot cone 14 without departing from the spirit and scope of the invention. Similarly, cutting edge 23 may have a shape that departs from a straight line.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hole finishing tool comprised of:
   a pilot support member at the most forward end, fittable in a hole in a workpiece, and a shank at the farthest back end by which it is rotated, said support member having a bore starting at its back end running longitudinally meeting a quarter round cut out in its forward most surface forming a quarter round slot through which said shank having a quarter round cutter formed at its most forward end is slidably fitted to, and able to longitudinally move forward and back,
   a means of resiliently biasing said support member towards the forward end of said shank while preventing said support member from being pushed off the forward most end of said shank and cutter,
   whereby without any axial force applied to said forward end of said support member, said cutter remains unexposed, and whereby when sufficient axial force is applied to said forward end of said support member said support member slides towards the back end of said shank exposing said cutter enabling it to cut.

2. A hole finishing tool according to claim 1, wherein said forward most surface is a portion of a cone.

3. A hole finishing tool according to claim 2, wherein said cone pilot support surface has a relieved edge 36 at the leading perimeter of its conical surface.

4. A hole finishing tool according to claim 1, wherein said quarter round cutter is a single lip cutting edge.

5. A hole finishing tool according to claim 1, wherein said support member is prevented from being urged off said forward end of said shank by a stop screw in said support member that is accommodated in notch in said shank.

6. A hole finishing tool according to claim 5, wherein said stop screw is positioned between 45 and 225 degrees counter-clockwise in a radial direction from said cutting edge.

7. A hole finishing tool according to claim 1, wherein said support member has a forward surface comprised of raised support bars separated by lower surfaces, such that when said surface contacts a workpiece said raised support bars touch the surface and said lower surfaces do not.

* * * * *